US006405762B1

(12) United States Patent
Bunch (10) Patent No.: US 6,405,762 B1
(45) Date of Patent: Jun. 18, 2002

(54) COMPOSITE PIPE ASSEMBLY AND METHOD FOR PREPARING THE SAME

(75) Inventor: Paul D. Bunch, Houston, TX (US)

(73) Assignee: Cooper Cameron Corporation, Houston, TX (US)

( * ) Notice: Subject to any disclaimer, the term of this patent is extended or adjusted under 35 U.S.C. 154(b) by 19 days.

(21) Appl. No.: 09/595,985

(22) Filed: Jun. 16, 2000

(51) Int. Cl.$^7$ ............ F16L 13/14; E21B 33/04
(52) U.S. Cl. .......... 138/109; 138/98; 285/382.4; 285/423
(58) Field of Search ............ 138/109, 98; 285/382.4, 285/382.5, 423

(56) References Cited

U.S. PATENT DOCUMENTS

| | | | |
|---|---|---|---|
| 3,357,456 A | 12/1967 | Grawey et al. | 138/127 |
| 3,575,447 A | 4/1971 | Merkle | 285/248 |

(List continued on next page.)

FOREIGN PATENT DOCUMENTS

| | | | |
|---|---|---|---|
| EP | 0 510 778 A1 | 10/1988 | E21B/33/04 |
| EP | 0 399 071 A1 | 5/1989 | B32B/15/01 |

OTHER PUBLICATIONS

W.F. Andersen "Advanced Composite Drilling Risers—Providing Cost Effective Systems for Deepwater Exploration and Production" Deepwater Technology Symposium; Dec. 2–5, 1997.
D.D. Baldwin et al "Composite Production Riser Design" OTC 8431; May 5–8, 1997.
"Composite Riser Products" ABB Vetco Graybrochure; 1999.
C.P. Sparks et al "Mechanical Testing of High–Performance Composite Tubes for TLP Production Risers" OTC 5795; May 2–5, 1988.

Primary Examiner—Patrick Brinson
(74) Attorney, Agent, or Firm—Peter A. Bielinski; Michael P. Hartmann (57) ABSTRACT

A composite pipe assembly comprises a pipe having a pipe wall, a housing comprising a tubular portion having an inner surface, said tubular portion being disposed around the outside of the pipe, and a tubular forge member having an outer surface. The forge member is disposed within the housing whereby a portion of the pipe wall is disposed between the inner surface of the tubular portion of the housing and the outer surface of said forge member. The forge member is deformed radially outwards against the pipe and the housing, preferably to beyond its yield point, and the tubular portion of the housing is thereby deformed radially outwards to a partial yield point. As a result, the tubular portion of the housing applies a compressive force radially inwards against the pipe wall and the forge member applies a force radially outwards against the pipe wall which serves to secure the housing to the pipe and provide a seal between the pipe and the inner surface of the tubular portion of the housing. The assembly is useful for providing an end fitting to a composite pipe, providing a repair to a section of damaged pipe, or providing a joint between two sections of pipe. The forge member and housing may both be applied to an existing composite pipe in order to prepare the assembly. Alternatively, the composite pipe may have its end portion formed around the forge member, for subsequent installation of a housing. The assembly may be employed with a composite pipe comprising a metallic liner, in which the end portion of the metallic advantageously forms the forge member.

37 Claims, 9 Drawing Sheets

U.S. PATENT DOCUMENTS

| | | | |
|---|---|---|---|
| 3,660,884 A | 5/1972 | Kowal | 29/237 |
| 4,236,386 A | 12/1980 | Yates et al. | 64/1 S |
| 4,256,412 A | 3/1981 | Tybus et al. | 403/267 |
| 4,634,314 A | 1/1987 | Pierce | 405/195 |
| 4,662,663 A | 5/1987 | Schmitz | 285/382.5 |
| 4,701,231 A | 10/1987 | Peters et al. | 156/172 |
| 4,768,275 A | 9/1988 | Schmitz | 29/407 |
| 4,791,796 A | 12/1988 | Ford | 72/62 |
| 4,805,430 A | 2/1989 | Schmitz et al. | 72/58 |
| 4,827,748 A | 5/1989 | Herring | 72/62 |
| 4,844,510 A | 7/1989 | Theiss et al. | 285/18 |
| 4,868,964 A | 9/1989 | Schmitz | 29/237 |
| 4,869,319 A | 9/1989 | Szymozak et al. | 166/115 |
| 4,887,846 A | 12/1989 | Chin et al. | 285/18 |
| 4,892,149 A | 1/1990 | Hoes et al. | 166/379 |
| 4,925,220 A | 5/1990 | Szymczak et al. | 285/382.4 |
| 4,986,698 A | 1/1991 | Chin | 405/169 |
| 5,010,952 A | 4/1991 | Chin et al. | 166/75.1 |
| 5,043,217 A | 8/1991 | Peters et al. | 428/397 |
| 5,215,413 A | 6/1993 | Mance | 403/259 |
| 5,261,462 A | 11/1993 | Wolfe et al. | 138/130 |
| 5,330,236 A | 7/1994 | Peterjohn et al. | 285/149 |
| 5,435,867 A | 7/1995 | Wolfe et al. | 156/171 |
| 5,439,323 A | 8/1995 | Mance | 405/195.1 |
| 5,443,099 A | 8/1995 | Chaussepied et al. | 138/109 |
| 5,474,132 A | 12/1995 | Gallagher | 166/367 |
| 5,685,576 A | 11/1997 | Wolfe et al. | 66/95 |
| 5,771,975 A | 6/1998 | Anderson et al. | 166/367 |
| 5,895,079 A | 4/1999 | Carstensen et al. | 285/333 |

COMPOSITE PIPE ASSEMBLY AND METHOD FOR PREPARING THE SAME

TECHNICAL FIELD OF THE INVENTION

The present invention relates to composite pipe assembly, for example a composite pipe assembly for use in oilfield applications, and to a method of preparing the same. The present invention further relates to a method of a repairing a composite pipe and to the repaired pipe so produced.

BACKGROUND OF THE INVENTION

Composite materials are finding increasing application in the replacement of metal. One field in which the use of composite materials is receiving increasing attention is in the manufacture of pipes and pipelines, in particular for use in oilfield exploration, drilling and production operations. Examples of applications for composite pipes are composite risers, including both composite drilling risers and composite production risers. Other applications include mooring tendons for offshore platforms, as well as choke lines, kill lines and auxiliary lines. Specification 17J of the American Petroleum Institute defines the specifications for unbonded flexible pipe.

The construction of composite pipes may take a variety of forms, depending upon the intended application of the pipe. Generally, composite pipes comprise a plurality of layers of material, the selection of the layers being determined by the intended application. U.S. Pat. Nos. 5,261,462 and 5,435,867 disclose a tubular structure, for example a pipe or a pressure vessel, comprising a wall formed from plastic, composites and elastomeric materials. The composite materials are wound in a spiral manner, separated by strips of elastomer. A mandrel is typically employed, over which the layers of material are wound or applied, after which the mandrel is removed.

As with all piping, composite pipes require end fittings to be provided in order to allow lengths of pipe to be coupled together or to allow the pipe to be connected to other pipes or apparatus. However, unlike conventional pipes, such as those made of steel, it is not possible to fashion couplings and end connections of the composite materials very easily or to connect standard metal fittings to the ends of composite pipe runs. In oilfield applications, as in many industries, it is very common to employ standard fittings, such as flanges and other couplings, with standard dimensions and thread patterns or other fastener arrangements. Accordingly, it would be highly desirable to provide a means of connecting such standard fittings to composite pipes.

A number of approaches have been taken to this problem. One approach is described by W. F. Andersen in "Advanced Composite Drilling Risers—Providing Cost Effective Systems for Deepwater Exploration and Production", Deepwater Technology Symposium, Dec. 2–5, 1997. Andersen describes the use of a so-called "geometric trap", in which a standard end connector is attached to a metal insert. The metal insert is wound into place during the fabrication of the composite pipe using a mandrel. A dome on the metal insert prevents the insert from being pulled out of the end of the composite pipe when in use. Once the fabrication has been completed, the mandrel is removed and the ends of the composite pipe machined to reveal the metal insert. A fitting or connector is then welded to the exposed end of the metal insert. Andersen notes that a special technique is required in order to cool the metal insert during the welding process, in order to avoid damage to the composite material of the pipe due to exposure to the heat generated by the welding process. Clearly, the need for such a welding step or the precautions required in order to prevent damage to the composite material is undesirable.

U.S. Pat. No. 4,701,231 discloses a method of forming a joint between a tubular composite and a metal ring, in which the metal ring is provided with a surface of given geometry, over which the composite material is wound during the fabrication of the tube. The geometry of the surface of the ring is determined so as to form an interference fit between the composite layers and the ring. In a development of this form of fitting, U.S. Pat. No. 5,771,975 describes a composite marine riser, in which an end connection is present having a segment over which the composite material is applied. Again, the segment of the end connection is provided with a contoured surface so as to prevent the withdrawal of the segment from the end of the riser. In a preferred embodiment, the end connection comprises two such segments over which the composite material is wound. Thereafter, the two segments are forced apart in order to provide an axial pre-load on the composite material.

It will be clear that the aforementioned approaches to the provision of end fittings in composite pipes all require the end fitting to be present and built into the pipe during the fabrication process. It would be desirable to provide end fittings and a method of applying them which could be applied to completed sections of composite pipes as and when required. Further, the forms of joint disclosed in U.S. Pat. Nos. 4,701,231 and 5,771,975 have a joint capacity that is dependent upon the strength of the composite material in the radial and circumferential directions of the pipe. This can be very limiting on the capacity of the joint to withstand high axial loads.

U.S. Pat. Nos. 5,261,462 and 5,435,867 disclose a method by which lengths of the composite pipe describe therein may be joined. In this method, various layers of the end portion of each length of pipe to be joined are cut away, revealing the innermost layer or liner. The lengths of pipe are joined by welding the ends of the liners together, after which composite material is wound around the joint. The joint is completed by the application of a plastic sleeve. U.S. Pat. Nos. 5,261,462 and 5,435,867 suggest, as an alternative, the use of a coupling having helical recesses over which the composite layers could be wound. It will be appreciated that this operation is both time consuming and costly in terms of the additional materials needed in order to fabricate the joint. In addition, the resulting joint is limited in its load capacity and efficiency.

U.S. Pat. No. 5,443,099 discloses a tube of a composite material having a metallic end coupling connected to one end. The end coupling is provided with an inner member, which extends within the end portion of the tube, and an outer member, extending along the outside of the end portion. Metallic pins extend through the outer member and the composite material into the inner member in order to secure the end coupling in place and prevent its withdrawal from the end of the tube. While such an arrangement can be applied to a completed composite pipe, the reliance upon metallic pins can compromise the integrity of the composite layer, causing points of stress concentration and leading to eventual failure.

U.S. Pat. No. 5,895,079 discloses a threaded connector for joining two lengths of composite pipe. The connector comprises a single, double ended tapered male member which extends into the end portions of the two pipes being joined. The outer tapered surface of the connector is formed with a thread to match corresponding threads on the inner surfaces of the end portions of the pipes. The connector may be applied to form a joint between two lengths of completed composite pipe. However, its application relies upon a thread being machined into the end portions of the pipes being joined. Such a machining operation is undesirable, particularly when use of the connector in remote oilfield locations is envisaged.

U.S. Pat. No. 5,685,576 discloses a pipe coupling for application to a completed composite pipe. The coupling comprises a male conical member to be inserted between the inner layers and outer layers of the end portion of the composite pipe. A female conical member or cup is placed over the end portion of the composite pipe. A filler is applied to fill the voids between the male and the female conical members. An axial force is applied between the male and female members in order to clamp the composite layers between the conical surfaces of the two members. Again, while this form of connector may be applied to a completed composite pipe, it requires a substantial operation to separate the layers of the composite pipe in the region of its end and to install the male and female members. The need for such an operation and the reliance of the joint on filler materials renders this form of joint a disadvantage when use in remote locations is envisaged.

Accordingly, it will be appreciated that there remains a need for a connector or end fitting for a composite pipe which may be applied to a finished pipe, as required, without the need for extensive machining or other operations.

SUMMARY OF THE INVENTION

According to a first aspect of the present invention, there is provided a composite pipe assembly comprising a pipe having a pipe wall with an inner surface and an outer surface; a housing comprising a tubular portion having an inner surface, said tubular portion disposed around the outside of the pipe; and a tubular forge member having an outer surface, said forge member disposed within the housing whereby a portion of the pipe wall is disposed between the inner surface of the tubular portion of said housing and the outer surface of said forge member; the forge member having been deformed radially outwards against the pipe and the housing and the tubular portion of the housing having been deformed radially outwards to a partial yield point; the tubular portion of the housing applying a compressive force radially inwards against the pipe wall and the forge member. The forge member preferably applies a force radially outwards against the inner surface of the pipe wall. The forge member is preferably deformed to beyond its yield point.

In applications in which the composite pipe assembly is to be subjected to high axial loads, for example in drilling risers and production risers for offshore oilfield operations, it is preferred to provide one of the inner surface of the tubular portion of the housing and the outer surface of the forge member with at least one rib. More preferably, both the inner surface of the tubular portion of the housing and the outer surface of the forge member are provided with a rib, the ribs being offset from each other in the axial direction of the pipe. For some applications it is most advantageous to provide a plurality of ribs and grooves on the inner surface of the tubular portion of the housing and the outer surface of the forge member, each rib being axially aligned with an opposing groove. The ribs, if provided, are preferably shaped so as not to penetrate or puncture the surface of the composite pipe. The ribs, if provided preferably extend circumferentially around the exterior of the pipe and, if extending around the entire circumference of the pipe, can provide a seal between the composite pipe and the inner surface of the tubular portion of the housing and the outer surface of the forge member. The number and arrangement of the ribs may be determined by the axial load capacity desired to be withstood by the composite pipe.

The composite pipe assembly may comprise an end fitting for the composite pipe, for example a flange, preferably mounted on the housing. Alternatively, the composite pipe assembly may act as a repair for a damaged section of the composite pipe or as a joint between two lengths of composite pipe.

In a further aspect, the present invention provides a method of applying an end fitting to a composite pipe, the composite pipe having a pipe wall having an inner surface and an outer surface, which method comprises: providing a housing having a tubular portion around the exterior of an end portion of the pipe wall; providing a tubular forge member within the pipe, whereby the end portion of the pipe wall extends between the forge member and the tubular portion of the housing; and deforming the forge member radially outwards, thereby deforming the tubular portion of the housing radially outwards beyond its partial yield point; whereby the tubular portion of the housing applies a radially inwards compressive force against the pipe wall and the forge member. Preferably, the forge member applies a force radially outwards against the inner surface of the pipe wall. The forge member is preferably deformed to beyond its yield point.

In one embodiment, the forge member is provided during the preparation of the composite pipe. In this embodiment, the layers of the end portion of the composite pipe are formed so as to overlie the outer surface of the forge member. While this embodiment precludes the installation of the assembly after the manufacture of the composite pipe, for example at a remote location in the field, it may result in a lower stress concentration in the composite material associated with the subsequent deforming of the forge member.

The tubular portion of the housing is preferably deformed such that it is partially yielded to no greater than 75%, more preferably to no greater than 50% of its yield point.

In still a further aspect of the present invention, there is provided a method of repairing a composite pipe comprising a pipe wall having an inner surface and an outer surface, the pipe wall having a damaged portion, which method comprises providing a housing having a tubular portion, the tubular portion of the housing extending around the exterior of the pipe wall covering the damaged region of the wall; providing a tubular forge member within the pipe such that the damaged region of the pipe wall is between the forge member and the tubular portion of the housing; and deforming the forge member radially outwards, thereby deforming the tubular portion of the housing radially outwards beyond its partial yield point; whereby the tubular portion of the housing applies a radially inwards compressive force against the pipe wall and the forge member. As before, the forge member once deformed preferably applies a force radially outwards against the inner surface of the pipe wall. Again, the forge member is preferably deformed to beyond its yield point.

The composite pipe may be formed with a metallic liner on its inside surface. Such a liner may be employed to seal the inside surface of the composite pipe to prevent leakage of fluid under pressure within the pipe. Such a composite pipe may be used in the methods and apparatus of the present invention as hereinbefore described. However, in a further embodiment the forge member may be formed as a unitary part with the metal liner. This may be achieved, for example, by forming the liner with an end portion of increased thickness.

A further aspect of the invention provides a fitting assembly for a composite pipe having a pipe wall with an inner surface and an outer surface, the fitting assembly comprising a housing having a tubular portion having an inner surface, which tubular portion is sized to extend around the exterior of a portion of the pipe wall; a tubular forge member having an outer surface for location within the composite pipe, whereby a portion of the of the pipe wall is between the outer surface of the tubular forge member and the inner surface of the tubular portion of the housing; the tubular forge member being deformable in a radially outward direction to thereby deform the tubular portion of the housing beyond its partial yield point, such that the tubular portion of the housing applies a residual compressive force radially inwards against the pipe wall and the forge member. The forge member is preferably formed so as to be deformable such that it will apply a force radially outwards against the inner surface of the pipe wall.

BRIEF DESCRIPTION OF THE DRAWINGS

The present invention will be understood more fully from the detailed description given herein below and from the accompanying drawings of preferred embodiments of the invention. The description and drawings should not be taken to limit the invention to the specific embodiments, but are for explanation and understanding purposes only.

In the drawings.

DETAILED DESCRIPTION OF THE PREFERRED EMBODIMENTS

Figure 1:
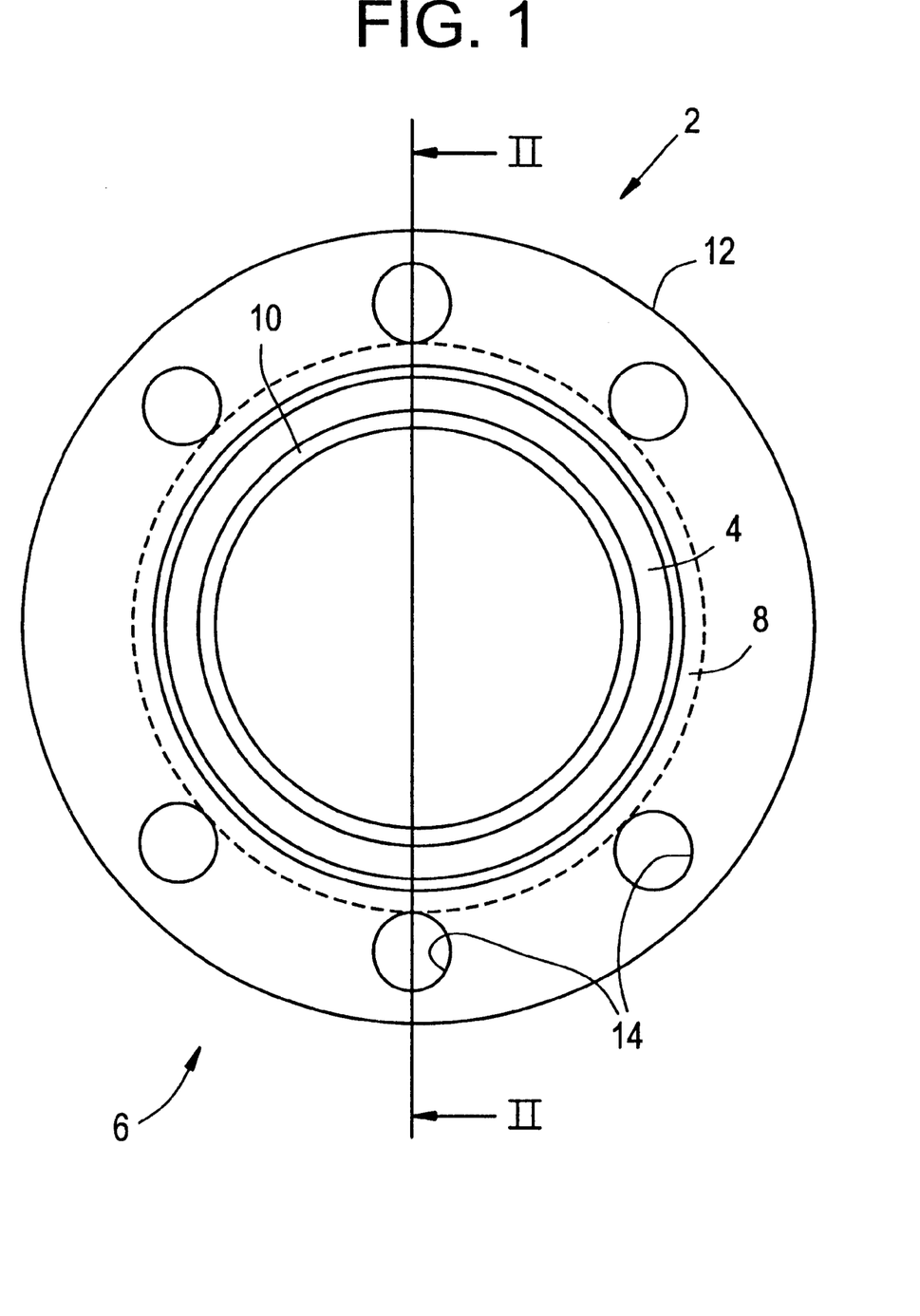
FIG. 1 is an end view of a composite pipe assembly according to the present invention comprising an end fitting for the pipe.
Figure 2:
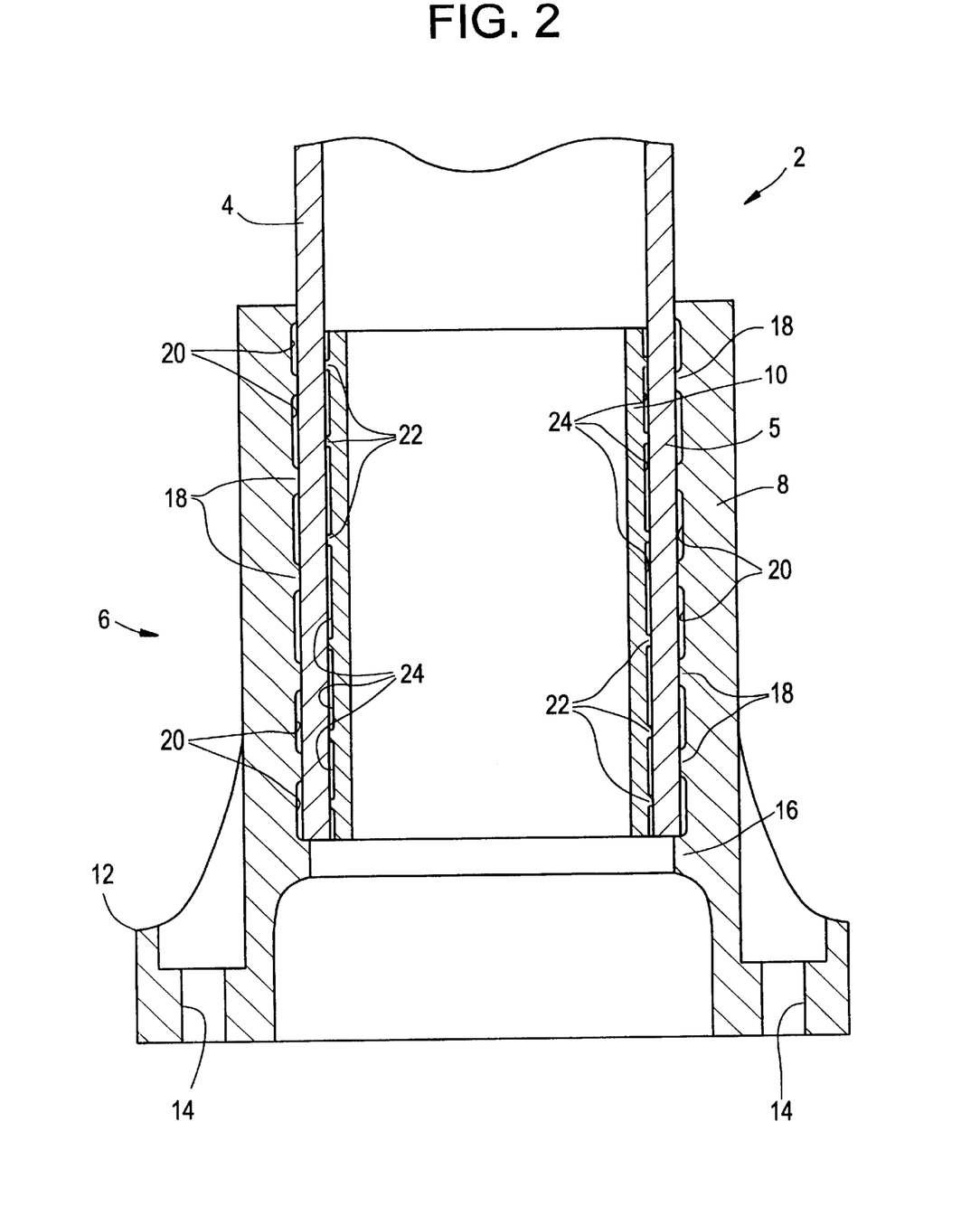
FIG. 2 is a cross-sectional view of the composite pipe assembly of FIG. 1 along the line II—II.

Referring to FIGS. 1 and 2, a composite pipe assembly, generally indicated as 2, comprises a composite pipe 4 with a pipe wall 5, having disposed around its end portion a housing, generally indicated as 6. The housing 6 comprises a tubular housing portion 8 extending coaxially along the end portion of the composite pipe 4. A tubular forge member 10 is disposed coaxially within the composite pipe 4 so as to lie within the tubular housing portion 8. The forge member 10 and housing 6 are shown before installation in FIGS. 8 and 9 respectively.

The housing 6 may further comprise a fitting for the composite pipe, for example an end fitting. It is an advantage of the assembly of the present invention that the housing may be formed with any standard fitting that is desired to be secured to the composite pipe. Thus, the housing 6 may comprise a flange, threaded coupling, pin or box thread. FIGS. 1 and 2 show the housing 6 provided with a standard flange 12 having holes 14 for accepting bolts for fastening the flange, and hence the composite pipe, to a corresponding fitting on another pipe or an apparatus, for example a pump or a vessel.

Referring to FIG. 2, the housing 6 comprises a widened bore at its end adjacent the flange 12, forming a shoulder 16 within the housing 6 at the end of the tubular housing portion 8 for receiving and abutting against the end of the composite pipe 4.

Figure 8:
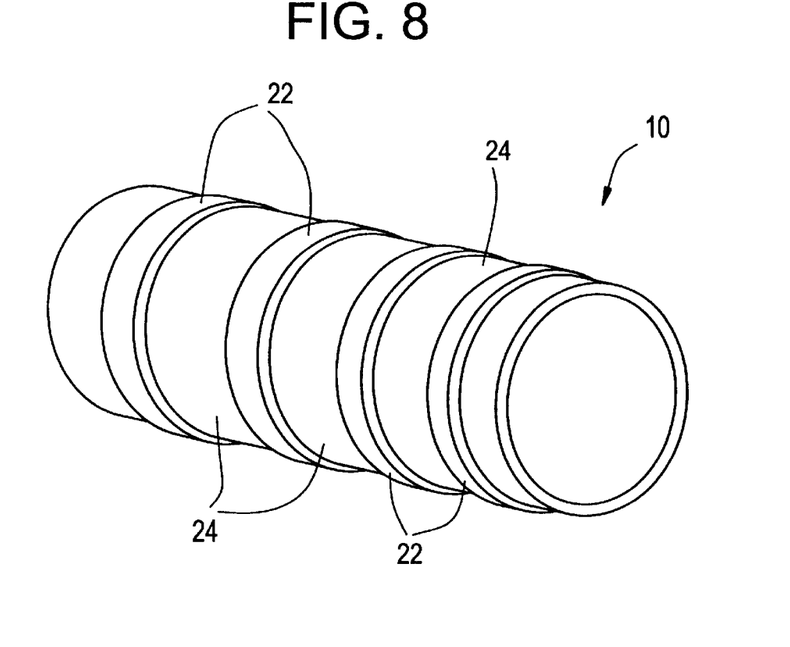
FIG. 8 is a perspective view of a forge member of a fitting for a composite pipe according to the present invention.
Figure 9:
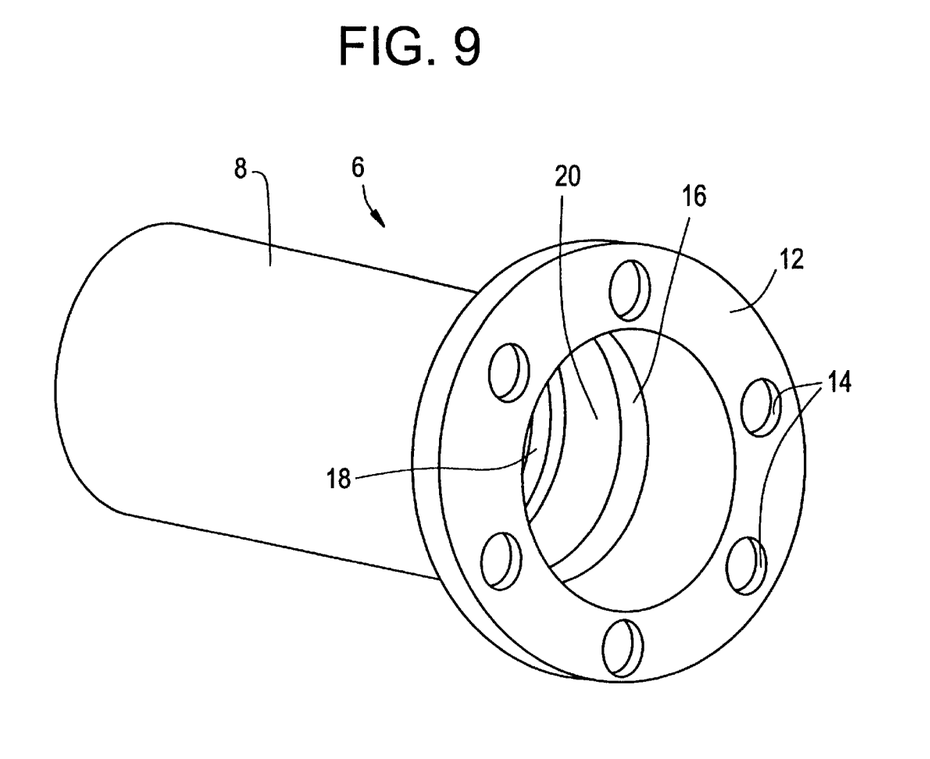
FIG. 9 is a perspective view of a housing of a fitting for a composite pipe according to the present invention.

The inner surface of the tubular housing portion 8 may be a plain surface, as may the outer surface of the forge member 10. If such is the case, the composite pipe 4 is held by means of friction between its inner and outer surfaces and the forge member 10 and the tubular housing portion 8 respectively. However, in order for the assembly to withstand higher axial loads without the composite pipe 4 separating from the assembly 2, it is preferable to provide a rib or projection on the inner surface of the tubular housing portion 8 or the outer surface of the forge member 10. It is more preferred to provide a plurality of ribs and grooves on one of the inner surface of the tubular portion 8 of the housing 6 or the outer surface of the forge member 10. If ribs and grooves are present on just one, they are preferably present on the inner surface of the tubular housing portion 8. In a preferred embodiment, a plurality of ribs and grooves are provided on both the inner surface of the tubular housing portion 8 and the outer surface of the forge member 10. Referring to FIG. 2, a plurality of ribs 18 are formed on the inner surface of the tubular housing portion 8. The ribs 18 are separated by grooves 20. The housing 6 with the ribs 18 and grooves 20 are also shown in FIG. 9. Similarly, as shown in FIGS. 2 and 8, the outer surface of the forge member 10 is formed with a plurality of ribs 22 and grooves 24. The ribs 18, 22 preferably extend circumferentially around the inner surface of the tubular portion of the housing 8 and the outer surface of the forge member 10, as shown in the figures. In this way, the ribs may act as seals preventing the flow of fluid either into or out of the pipe assembly. In the alternative, the ribs may extend around only a partial circumference. While such ribs will provide an improved interference fit between both the forge member 10 and the tubular portion 8 of the housing and the composite pipe, the ribs will not provide the sealing function just described.

Figure 3:
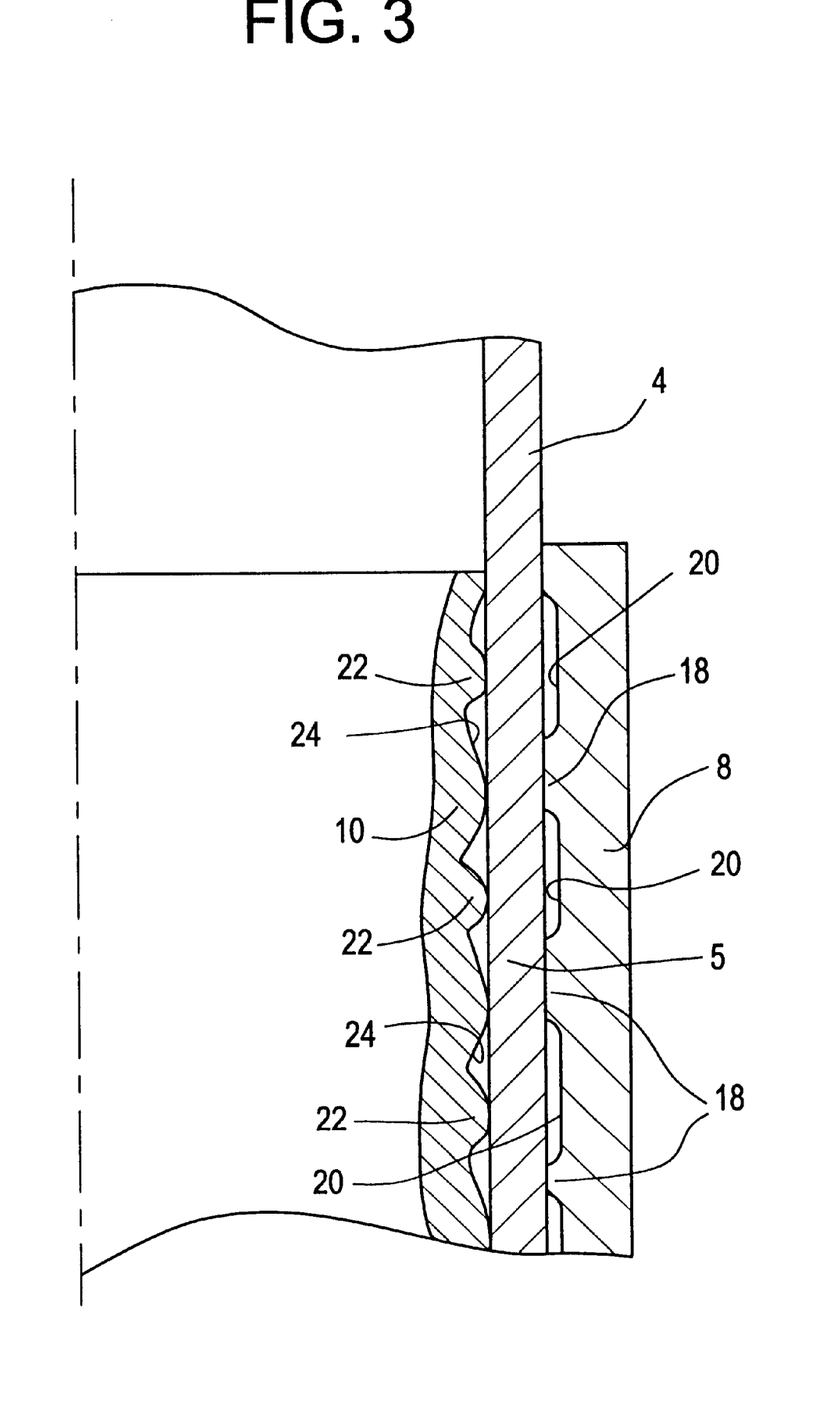
FIG. 3 is a view of a portion of the cross-sectional view of FIG. 2 on an enlarged scale.

FIG. 3 is an enlarged view of a portion of the composite pipe 4, the tubular housing portion 8 and the forge member 10. As shown in FIG. 2 and more clearly visible in FIG. 3, the ribs 18 and grooves 20 of the tubular housing portion 8 are arranged in an offset pattern with respect to the ribs 22 and grooves 24 of the forge member 10. Thus, each rib 18 of the tubular housing portion 8 is offset in the axial or longitudinal direction from the rib 22 of the forge member 10, such that each rib 18 of the tubular housing portion 8 opposes a groove 24 in the outer surface of the forge member 10. Similarly, each rib 22 of the forge member 10 opposes a groove 20 in the inner surface of the tubular housing portion 8. In this way, each rib 18, 22 contacts an unsupported span of the wall 5 of the composite pipe 4. Preferably, the ribs 18, 22 and grooves 20, 24 extend around the entire circumference of the inner surface of the tubular housing portion 8 and the outer surface of the forge member 10. In this way, the opposing ribs 18, 22 and grooves 20, 24 cooperate to provide a seal between the composite pipe 4, the housing 6 and the forge member 10.

The composite pipe assembly 2 is assembled in the following manner. The end portion of the composite pipe 4 is inserted into the tubular portion 8 of the housing 6 from the end of the housing 6 opposite the end with the flange 12. The composite pipe 4 is inserted into the housing 6 until the end face of the wall 5 of the pipe 4 abuts the shoulder 16 within the housing 6. The forge member 10 is then inserted into the end portion of the composite pipe 4 so as to lie totally within the tubular portion 8 of the housing 6, as shown in FIG. 2. Thereafter, the forge member 10 is subjected to an internal pressure, sufficient to deform the forge member 10, the wall 5 of the pipe 4, and the tubular portion 8 of the housing 6 radially outwards. Means for subjecting the forge member to an internal pressure are known in the art. For example, U.S. Pat. Nos. 4,388,752, 4,791,796, 4,805,430 and 4,827,748 disclose cold forging tools for exerting radially outward forces.

Figure 10:
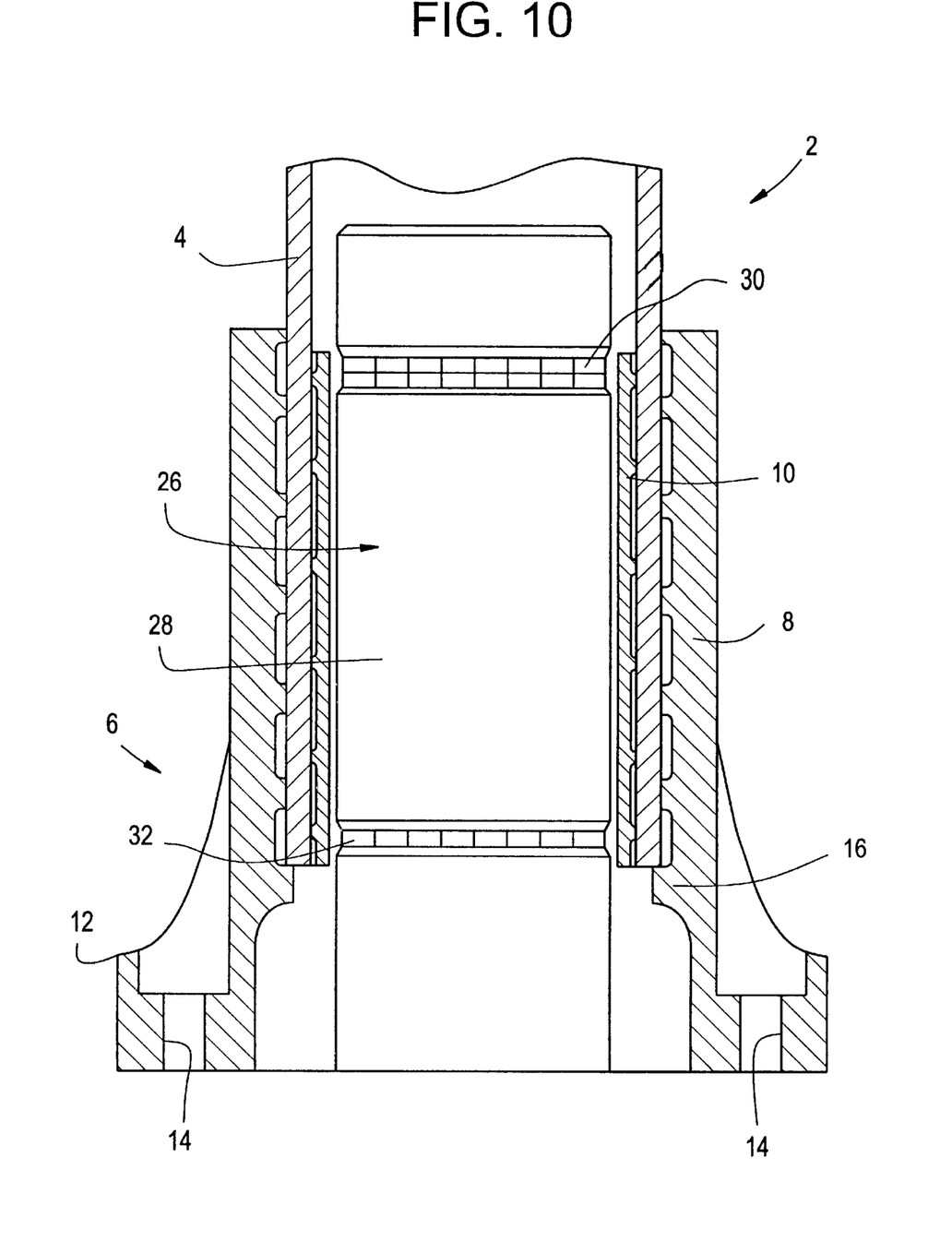
FIG. 10 is a cross-sectional view of the composite pipe assembly of FIG. 1 with a forging tool in place.

As shown in FIG. 10, a forging tool 26 is inserted into the forge member. The forging tool, generally indicated as 26, is generally cylindrical and comprises a cylindrical sleeve 28. The cylindrical sleeve 28 is of a resilient material, such as a rubber, such that under the action of a pressure applied within the sleeve 28, it can increase in diameter and expand in a radially outwards direction. Upper and lower sealing rings 30 and 32 are located circumferentially around the forging tool 26 adjacent respective ends of the cylindrical sleeve 28. The sealing rings 30 and 32 act to contain the sleeve 28 and limit its expansion in an axial direction under the action of an applied internal pressure. In operation, the forging tool 26 is inserted into the forge member 10, such that the cylindrical sleeve 28 of the forging tool 26 is located within the forge member 10, as shown in FIG. 10. A fluid under pressure is introduced into the interior of the forging tool 26 from a reservoir through feed lines (not shown) connected to the forging tool 26. Under the action of the fluid pressure, the cylindrical sleeve 28 expands and applies a uniform pressure on the inner surface of the forge member 10.

Under the action of the forging tool 26, the assembly 2 is subjected to cold forging, as a result of which the forge member 10 is deformed by cold forging radially outwards. This in turn deforms the wall 5 of the end portion of the composite pipe 4 and the tubular portion 8 of the housing 6. The forge member 10 is preferably deformed to beyond its yield point such that it is fully plastic throughout its thickness. The tubular portion 8 of the housing 6 is also deformed radially outwards. However, the deformation of the forge member 10 under the action of the forging tool 26 is limited such that the tubular portion 8 of the housing 6 is deformed to a partial yield point. In this respect, the term "partial yield" is to be understood to mean that the wall of the housing 6 making up the tubular portion 8 has been deformed beyond its yield point at its inner surface, but not at its outer surface. The tubular portion 8 of the housing 6 is preferably deformed to a partial yield point of no greater than 75%, that is no more than 75% of the volume of the wall of the tubular portion 8 of the housing 6 has been deformed beyond its yield point. More preferably, the tubular portion has been deformed to a partial yield point of no greater than 50% of its volume.

The deformation of the tubular portion 8 of the housing 6 to a partial yield point gives rise to residual forces acting in the assembly 2 once the forging tool is released and removed. In particular, the partially yielded tubular portion 8 of the housing 6 applies a residual radial force inwards against the wall of the composite pipe 4. This loading ensures the transfer of axial loads within the composite pipe 4 to the assembly 2 and provide a means of sealing the assembly, assisted by the afore described ribs and grooves, if present.

As shown in detail in FIG. 3, in the preferred embodiment for high axial load applications, the action of the forging tool 26 is to deform the forge member 10 and, to a lesser extent, the wall 5 of the composite pipe 4. In particular, the portion of the wall 5 of the composite pipe 4 is contacted by ribs, either a rib 18 on the inner surface of the tubular housing portion 8 or a rib 22 on the outer surface of the forge member 10. The ribs 18 on the inner surface of the tubular housing portion 8 are offset in the longitudinal direction from the ribs 22 on the outer surface of the forge member 10. In this way, the wall 5 of the composite pipe 4 deforms into the grooves 20, 24 opposing the ribs 18 and 22. In this way, the composite pipe 4 is locked to the housing 6. The ribs 18, 22 are spaced to provide a uniform distribution of force along the axial length of the tubular portion 8 of the housing 6. However, the ribs 18, 22 should be sized and positioned so as not to give rise to a failure in the integrity of the wall 5 of the composite pipe 4 at the point at which it contacts the ribs, as a result of local stress concentrations brought about by the cold forging process. Further, in order to reduce the possibility of the composite pipe failing at the point of contact with a rib 18, 22, the ribs are preferably shaped, for example by being rounded, so as not to penetrate into the wall 5 of the composite pipe 4 under the action of the cold forging process. The number, size and spacing of the ribs 18, 22 and the grooves 20, 24 is varied according to the axial load to be borne by the composite pipe assembly when in use.

Throughout the entire cold forging process, the force applied by the forging tool 26 and the residual forces remaining in the assembly are maintained at a level below the fiber strength of the composite pipe 4. That is, the composite pipe 4 is not exposed to a force sufficient to cause damage and failure to the composite material of any of the layers of the pipe.

As already noted above, the method for installing the composite pipe assembly on the end of an existing composite pipe may be carried out on any conventional composite pipe as and when required. The composite pipe may comprise a liner, for example an elastomeric or metallic liner, on its inner surface, as dictated by the end use application of the composite pipe assembly. The use of such liners is known in the art. It is not necessary that the composite pipe be formed or prepared in any special manner in order to have a composite pipe assembly of the present invention applied. This allows the assembly of the present invention to be installed in the field in remote locations, with a minimum of preparation and with no special modifications to the composite pipe. Thus a fitting, such as an end connection may be applied to a standard, existing composite pipe.

Figure 4:
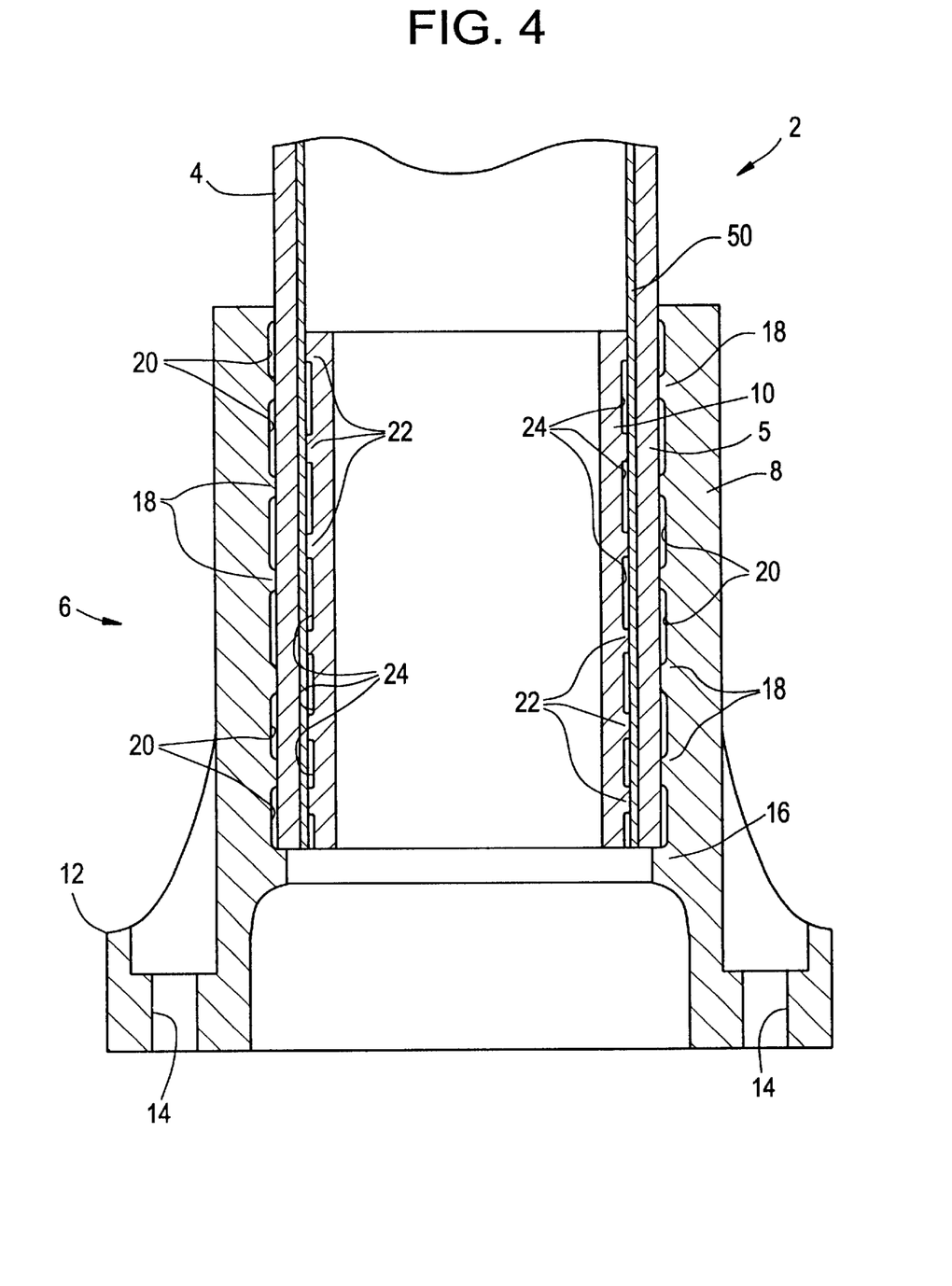
FIG. 4 is a cross-sectional view of a second embodiment of the composite pipe assembly of the present invention, in which the composite pipe comprises a liner.

As noted, the composite pipe may comprise a liner, in particular a metallic liner, on its inner surface. Referring to FIG. 4, there is shown a cross-sectional view of a further embodiment of the composite pipe assembly of the present invention. Components of the embodiment of FIG. 4 that are common to the embodiment of FIG. 2 are indicated with the same reference numerals and are as described above. As shown in FIG. 4, the composite pipe 4 comprises a cylindrical metallic liner 50 extending along the length of the inner surface of the composite pipe 4. Such a liner may be employed, for example, to provide a seal on the inner surface of the composite pipe 4 and prevent fluid leakage. Composite pipes having such liners as the liner 50 shown in FIG. 4 are known in the art. Titanium is of particular use as the liner material for composite pipes. The liner is typically included in the composite pipe during the manufacturing stage, with the layers of composite material being wound around the liner. As shown in FIG. 4, the forge member 10 is located within the end portion of the composite pipe 4 such that the outer surface of the forge member 10 is in contact with the inner surface of the metallic liner 50.

Figure 5:
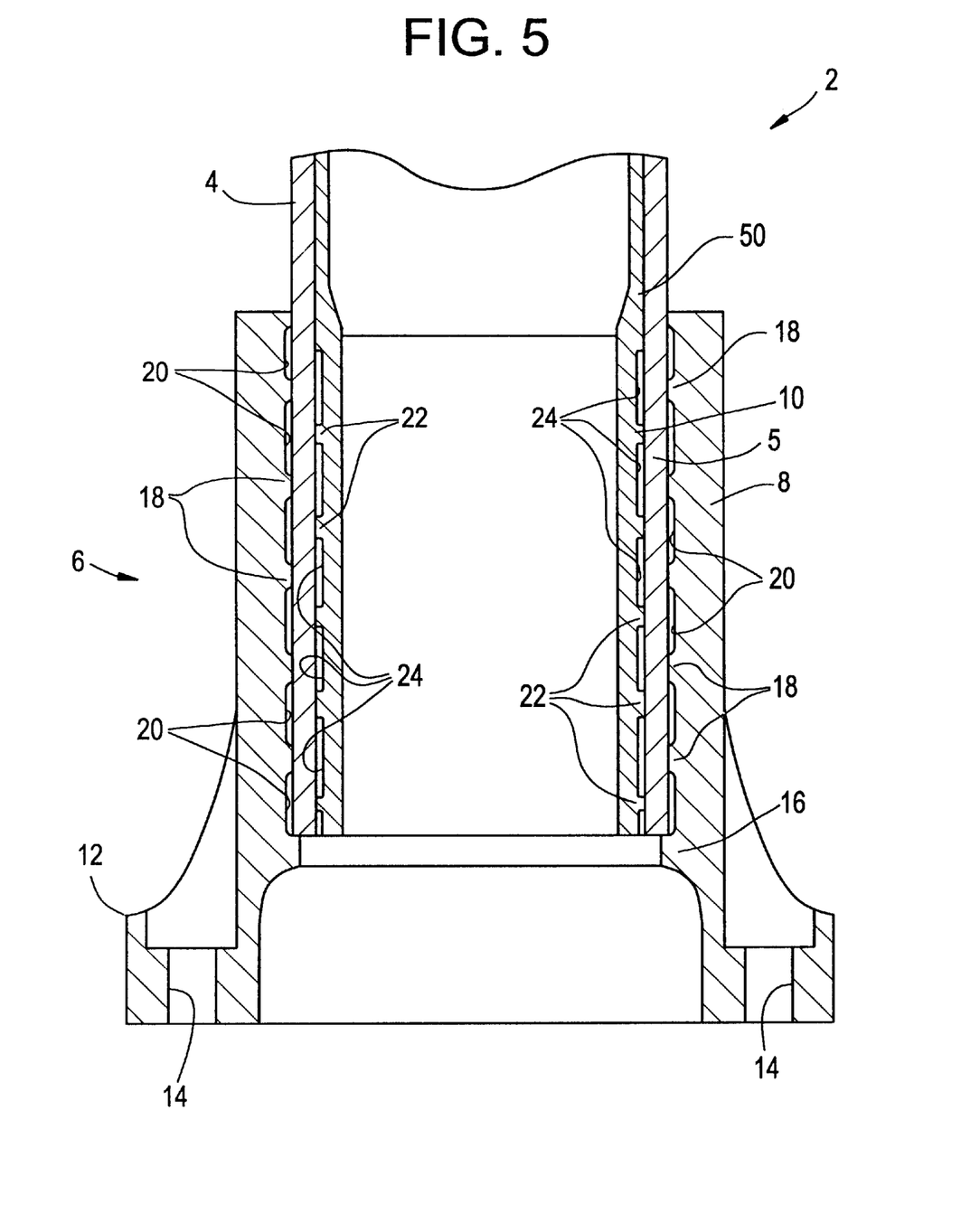
FIG. 5 is a cross-sectional view of a further embodiment of the composite pipe assembly of the present invention in which the composite pipe comprises a liner with an integral forge member.

FIG. 5 illustrates a further embodiment of the present invention, in which the composite pipe assembly also comprises a liner. The features of the embodiment of FIG. 5 common to those of FIGS. 2 and 4 have been identified using the same reference numerals and are as described hereinbefore. Thus, the assembly shown in FIG. 5 comprises a metallic liner 50. However, the forge member 10 is integral with the metallic liner 50 and is formed from the end portion of the metallic liner. If necessary, the end portion of the metallic liner 50 may be of increased thickness, as shown in FIG. 5, in order to allow it to function better as the forge member 10. The thickness of the end portion of the metallic liner 50 will thus be determined by its duty as part of the liner, together with the duty to be performed as the forge member.

Figure 6:
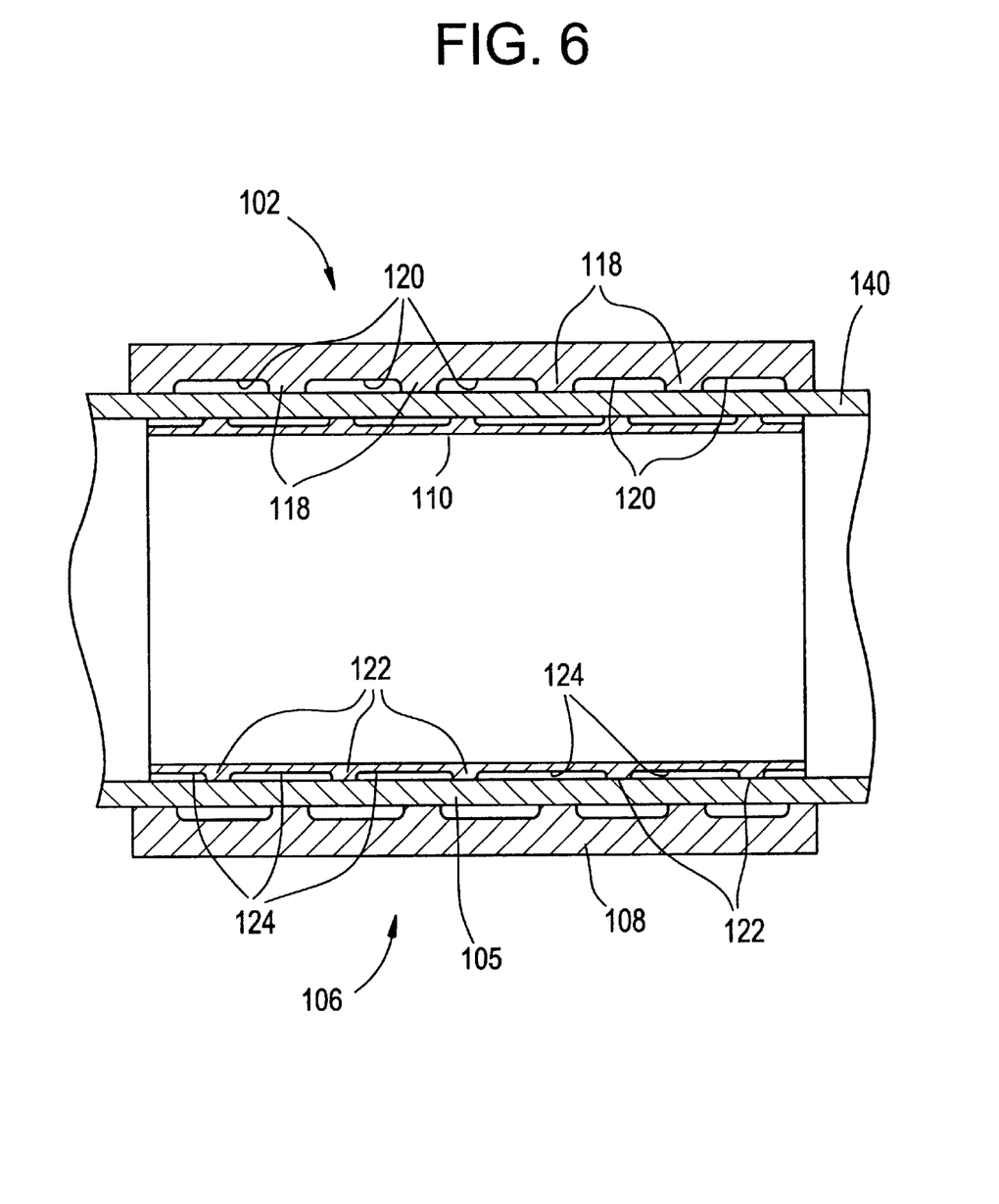
FIG. 6 is a cross-sectional view of a repair to a composite pipe comprising a composite pipe assembly of the present invention.

In addition, the assembly of the present invention may be applied as a repair to a ruptured or damaged composite pipe. FIG. 6 shows a cross-sectional view of an assembly of the present invention installed to effect a repair around a section of composite pipe. Referring to FIG. 6, a repair assembly, generally indicated as 102, has been applied to the damaged portion of the wall 105 of a composite pipe 104. A housing, generally indicated as 106, comprises a tubular body 108, extending around and along the damaged portion of the composite pipe 104. A forge member 110 is located co-axially with the composite pipe 104 and the housing 102 within the composite pipe 104, such that the damaged portion of the wall of the composite pipe 104 is between the outer surface of the forge member 110 and the inner surface of the tubular body 108 of the housing 106. The inner surface of the tubular body 108 of the housing 106 is formed with a plurality of circumferential ribs 118, separated by circumferential grooves 120. Similarly, the outside surface of the forge member 110 is formed with a plurality of circumferential ribs 122 separated by a plurality of grooves 124. As described above with respect to the end fitting assembly, the ribs 122 on the outer surface of the forge member 110 are offset from the ribs on the inner surface of the housing 106 in the axial direction, such that each rib 122, 124 contacts an unsupported portion of the wall of the composite pipe 104.

The method of installation of the repair assembly 102 shown in FIG. 6 is the same as described above with respect to the installation of the end fitting. Thus, the forge member 110 is cold forged under the action of a forging tool (not shown in FIG. 6) such that it is deformed radially outwards. This in turn deforms the composite pipe 104 and the tubular body 108 of the housing 106. The forge member is again deformed beyond its yield point such that it is plastically deformed. The tubular body 108 of the housing 106 is deformed radially outwards to a partial yield point (as hereinbefore defined). Again, once the forging tool is removed, the housing 106 exerts a residual radial force inwards against the wall 105 of the composite pipe 104 and the forge member 110. This residual force acts to seal the damaged portion of the wall 105 of the composite pipe 104. This seal is further assisted by the interaction of the ribs 118, 122 and grooves 120, 124, as described above with respect to the end fitting.

Figure 7:
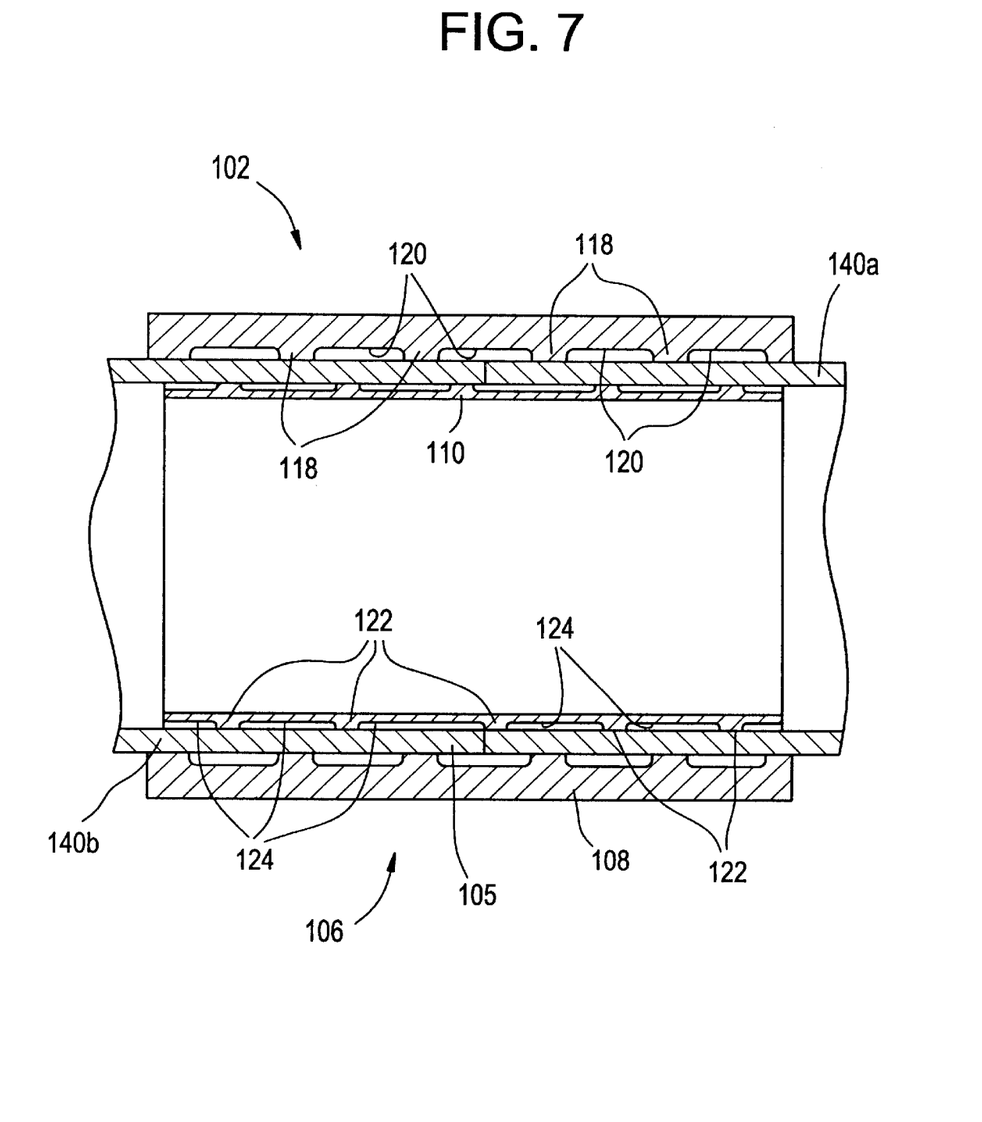
FIG. 7 is a cross-sectional view of a further embodiment of the present invention forming a joint between two sections of composite pipe.

In cases of severe damage to the composite pipe, it may be necessary to cut out and discard the damaged section and join the thus formed two ends of pipe. FIG. 7 illustrates the application of the assembly shown in FIG. 6 to join two such ends of a pipe. Features of FIG. 7 that are common to FIG. 6 have been identified using the same reference numerals and are as described hereinbefore. In the joint shown in FIG. 7, the end portion of a first composite pipe 104a is joined to the end portion of a second composite pipe 104b. As noted above, the two end portions may arise out of the need to repair a damaged section of pipe. Alternatively, the two end portions may be from two separate pipes, the joint of FIG. 7 being employed instead of a more conventional flanged joint. In this respect, the joint of FIG. 7 allows two lengths of composite pipe to be joined, with the resulting joint being of lower weight and minimal diameter, compared with the more conventional flanged joint.

To form the joint of FIG. 7, a portion of the forge member 110 is introduced into the end of one of the composite pipes 104a, 104b. The end of the second composite pipe 104b, 104a is slid over the remaining portion of the forge member 110 until it abuts the first composite pipe. The housing 106 is aligned with the forge member 110 around the outside of the composite pipes 104a, 104b. The procedure outlined above to expand the forge member radially outwards is then followed to complete the formation of the joint.

In an alternative embodiment for the installation of an assembly of the present invention, the composite pipe itself is prepared with the fitting of a composite pipe assembly of the present invention in mind. In the alternative embodiment, the forge member 10, 110 is incorporated into the end portion of the composite pipe 4, 104 during the manufacture of the pipe. Specifically, the layers of the wall 5, 105 of the end portion of the composite pipe 4, 104 are wound and formed around the outside of the forge member 10, 110. In this way, the forge member 10, 110 is present in situ in the end portion of the pipe 4, 104. Once it has been decided to apply an assembly of the present invention to the pipe, such as apply an end fitting as shown in FIG. 2 or prepare a joint as shown in FIG. 7, the cold forging method described above is followed to install the housing 6, 106 and lock it securely to the outside of the composite pipe 4, 104. This second embodiment lacks certain advantages of the first embodiment, that is the second embodiment requires the composite pipe to be prepared in a specific manner before installation of the assembly of the present invention can take place. However, by preforming the end portion of the composite pipe 4, 104 over the forge member 10, 110, the force required during the cold forging process to install a housing 6, 106 is reduced. Further, the forces induced during the cold forging process have been found to be concentrated in the radial and hoop directions. This reduces the stress concentration associated with the deforming of the composite by the ribs 18, 118, 22, 122. This in turn reduces the potential for damage to the composite pipe 4, 104. This alternative method of forming the assembly of the present invention is not applicable to the repair assembly described above and shown in FIG. 6. However, it is applicable to the installation of any end fitting falling within the scope of the present invention.

The composite pipe 4, 104 may be any of the composite pipes known in the art. Typically, such composite pipes comprise a plurality of layers of different materials, for example carbon fibers and glass fibers, in an epoxy resin matrix. Commonly, the composite pipes are prepared by winding the fibers impregnated with the epoxy resin using the filament winding process around a mandrel. As an alternative, if it is required to have a metallic liner present in the finished pipe, the filament winding process may be carried out around the liner itself The epoxy is allowed to cure, in order to complete the composite structure. The selection of the materials, the number, arrangement and thickness of the individual layers, together with the orientation of the fibers in the individual layers, are determined by aspects of the eventual use to be made of the pipe. For example, laminates of carbon fibers are typically employed to impart resistance to axial and radial loading of the composite pipe. Epoxy/glass fiber laminates are often employed to impart resistance to radial compression and for sealing purposes. Typical factors of importance in designing such a composite pipe include the required axial strength and stiffness, the maximum circumferential load to be applied as a result of internal and external pressure, damage tolerance and resistance to impact.

The housing 6, 106 and forge member 10, 110 may be formed from any suitable material which is susceptible to cold forging. The most convenient materials for forming the housing 6, 106 and forge member 10, 110 are the various grades of steel used in the manufacture of standard fittings. Alternatively, where required, the housing 6, 106 and forge member 10, 110 may be formed from any other suitable metal or combination of metals, for example aluminum and copper, or alloys, for example nickel-based alloys or brass.

As already noted above, the composite pipe assembly of the present invention may comprise an end fitting for the composite pipe. Alternatively, the assembly may be employed as a repair to a damaged or ruptured composite pipe. In addition, the assembly may be used to join two lengths of composite pipe.

It is envisaged that the forge member 10 and housing 6 shown in FIGS. 8 and 9 respectively may be provided as a fitting for application to existing composite pipes, either directly after manufacturing of the pipe is complete or at a later time, for example in the field. In cases in which the composite pipe as prepared includes the forge member, either incorporated into the pipe during manufacture or as an integral portion of a metallic liner in the pipe, as discussed above, it will be sufficient to provide simply a housing 6 as shown in FIG. 9.

The assembly of the present invention may be used in any applications for which composite pipes find use. In particular, the composite pipe assembly of this invention is of use in the construction of drilling and production risers in oilfield applications, together with choke and kill lines, and auxiliary lines. Finally, the assembly finds use in the construction of tether systems for oil exploration and production.

While the particular embodiments for the method and apparatus of the present invention as herein disclosed in detail are fully capable of obtaining the objects and advantages herein stated, it is to be understood that they are merely illustrative of the presently preferred embodiments of the invention and that no limitations are intended by the details of method of operation, details of construction or design herein shown other than as described in the appended claims.

What I claim is:

1. A composite pipe assembly comprising:
    a composite pipe having a pipe wall, the pipe wall having an inner surface and an outer surface;
    a housing comprising a tubular portion having an inner surface, said tubular portion disposed around the outside of the composite pipe; and
    a tubular forge member having an outer surface, said forge member disposed within the housing whereby a portion of the pipe wall is disposed between the inner surface of the tubular portion of said housing and the outer surface of said forge member;
    the forge member having been deformed radially outwards against the composite pipe and the housing and the tubular portion of the housing having thereby been deformed radially outwards to a partial yield point;
    the tubular portion of the housing applying a compressive force radially inwards against the pipe wall and the forge member.

2. The composite pipe assembly of claim 1, wherein the forge member has been deformed beyond its yield point.

3. The composite pipe assembly of claim 1, wherein the forge member applies a force radially outwards against the inner surface of the pipe wall.

4. The composite pipe assembly of claim 1, wherein a rib is disposed on one of the inner surface of the tubular portion of the housing and the outer surface of the forge member.

5. The composite pipe assembly of claim 4, wherein the inner surface of the tubular portion of the housing and the outer surface of the forge member each comprise a rib, the rib on the inner surface of the tubular portion of the housing being offset from the rib on the outer surface of the forge member in the axial direction of the pipe.

6. The composite pipe assembly of claim 5, wherein the inner surface of the tubular portion of the housing and the outer surface of the forge member each comprise a plurality of ribs and grooves, each rib on one of the inner surface of the tubular portion of the housing and the outer surface of the forge member opposing a groove in the other of the inner surface of the tubular portion of the housing and the outer surface of the forge member.

7. The composite pipe assembly of claim 4, wherein the rib is shaped to prevent penetration of the rib into the pipe wall.

8. The composite pipe assembly of claim 4, wherein the rib extends circumferentially around the pipe wall.

9. The composite pipe assembly of claim 1, wherein the tubular portion of the housing is yielded to within the range of 50% to 75% of its yield point.

10. The composite pipe assembly of claim 1, wherein the housing further comprises an end fitting for the pipe.

11. The composite pipe assembly of claim 1, wherein the housing and the forge member comprise a joint between two lengths of composite pipe.

12. The composite pipe assembly of claim 1, wherein the composite pipe comprises a metallic liner.

13. The composite pipe assembly of claim 12, wherein the forge member is formed by an end portion of the metallic liner.

14. A method of preparing a composite pipe assembly, the composite pipe having a pipe wall having an inner surface and an outer surface, which method comprises:
    providing a housing having a tubular portion around the exterior of an end portion of the pipe wall;
    providing a tubular forge member within the composite pipe, whereby the end portion of the pipe wall extends between the forge member and the tubular portion of the housing; and deforming the forge member radially outwards, thereby deforming the tubular portion of the housing radially outwards beyond its partial yield point;

whereby the tubular portion of the housing applies a radially inwards compressive force against the pipe wall and the forge member.

15. The method of claim 14, wherein the forge member is deformed beyond its yield point.

16. The method of claim 14, wherein the forge member, once deformed, applies a force radially outwards against the inner surface of the pipe wall.

17. The method of claim 14, wherein the forge member is provided during the preparation of the composite pipe, the end portion of the composite pipe being formed to overlie the outer surface of the forge member.

18. The method of claim 14, wherein a rib is disposed on one of the inner surface of the tubular portion of the housing and the outer surface of the forge member.

19. The method of claim 18, wherein the inner surface of the tubular portion of the housing and the outer surface of the forge member each comprise a rib, the rib on the inner surface of the tubular portion of the housing being offset from the rib on the outer surface of the forge member in the axial direction of the pipe.

20. The method of claim 19, wherein the inner surface of the tubular portion of the housing and the outer surface of the forge member each comprise a plurality of ribs and grooves, each rib on one of the inner surface of the tubular portion of the housing and the outer surface of the forge member opposing a groove in the other of the inner surface of the tubular portion of the housing and the outer surface of the forge member.

21. The method of claim 18, wherein the rib is shaped to prevent penetration of the rib into the pipe wall.

22. The method of claim 18, wherein the rib extends circumferentially around the pipe wall.

23. The method of claim 14, wherein the tubular portion of the housing is yielded to within the range of 50% to 75% of its yield point.

24. The method of claim 14, wherein the composite pipe assembly comprises an end fitting to the pipe.

25. The method of claim 14, wherein the composite pipe assembly comprises a joint between two end portions of pipe.

26. A method of repairing a composite pipe comprising a pipe wall having an inner surface and an outer surface, the pipe wall having a damaged portion, which method comprises:

providing a housing having a tubular portion, the tubular portion of the housing extending around the exterior of the pipe wall covering the damaged region of the wall;

providing a tubular forge member within the composite pipe such that the damaged region of the pipe wall is between the forge member and the tubular portion of the housing; and deforming the forge member radially outwards, thereby deforming the tubular portion of the housing radially outwards beyond its partial yield point;

whereby the tubular portion of the housing applies a radially inwards compressive force against the pipe wall and the forge member.

27. The method of claim 26, wherein the forge member is deformed beyond its yield point.

28. The method of claim 26, wherein the forge member, after being deformed, applies a force radially outwards against the inner surface of the pipe wall.

29. A fitting for a composite pipe comprising a pipe wall having an inner surface and an outer surface, the fitting comprising:

a housing comprising a tubular portion having an inner surface, which tubular portion is sized to extend around the exterior of a portion of the pipe wall;

a tubular forge member, having an outer surface, for location within the composite pipe, whereby a portion of the of the pipe wall is between the outer surface of the tubular forge member and the inner surface of the tubular portion of the housing;

the tubular forge member being deformable in a radially outward direction to thereby deform the tubular portion of the housing beyond its partial yield point, such that the tubular portion of the housing applies a residual compressive force radially inwards against the pipe wall and the forge member.

30. The fitting of claim 29, wherein the forge member is deformable so as to apply a force radially outwards against the inner surface of the pipe wall.

31. The fitting of claim 29, further comprising a rib on one of the outer surface of the forge member and the inner surface of the tubular portion of the housing.

32. The fitting of claim 31, wherein the inner surface of the tubular portion of the housing and the outer surface of the forge member each comprise a rib, the rib on the inner surface of the tubular portion of the housing being offset from the rib on the outer surface of the forge member in the axial direction when the forge member and housing are assembled with the pipe.

33. The fitting of claim 32, wherein the inner surface of the tubular portion of the housing and the outer surface of the forge member each comprise a plurality of ribs and grooves, each rib on one of the inner surface of the tubular portion of the housing and the outer surface of the forge member opposing a groove in the other of the inner surface of the tubular portion of the housing and the outer surface of the forge member, when the housing and forge member are assembled with a pipe.

34. The fitting of claim 31, wherein the rib is shaped to prevent penetration of the rib into the pipe wall.

35. The fitting of claim 31, wherein the rib extends circumferentially.

36. The fitting of claim 29, wherein the housing further comprises an end fitting for the pipe.

37. The fitting of claim 29, wherein the housing a forge member comprise a joint between two end portions of pipe.

* * * * *